Figure 1:
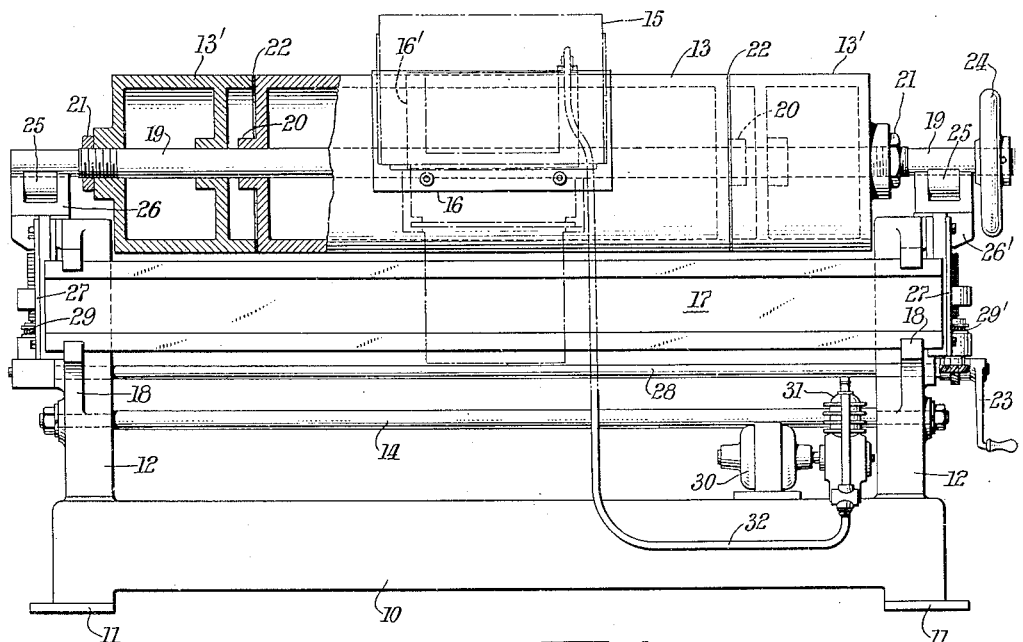

Feb. 21, 1950

W. C. HUEBNER 2,497,991

PHOTOGRAPHIC CYLINDRICAL COMPOSING APPARATUS
HAVING AUXILIARY SUPPORTS

Filed May 2, 1947

2 Sheets-Sheet 1

INVENTOR.

William C. Huebner

BY

John Kwarder

AGENT.

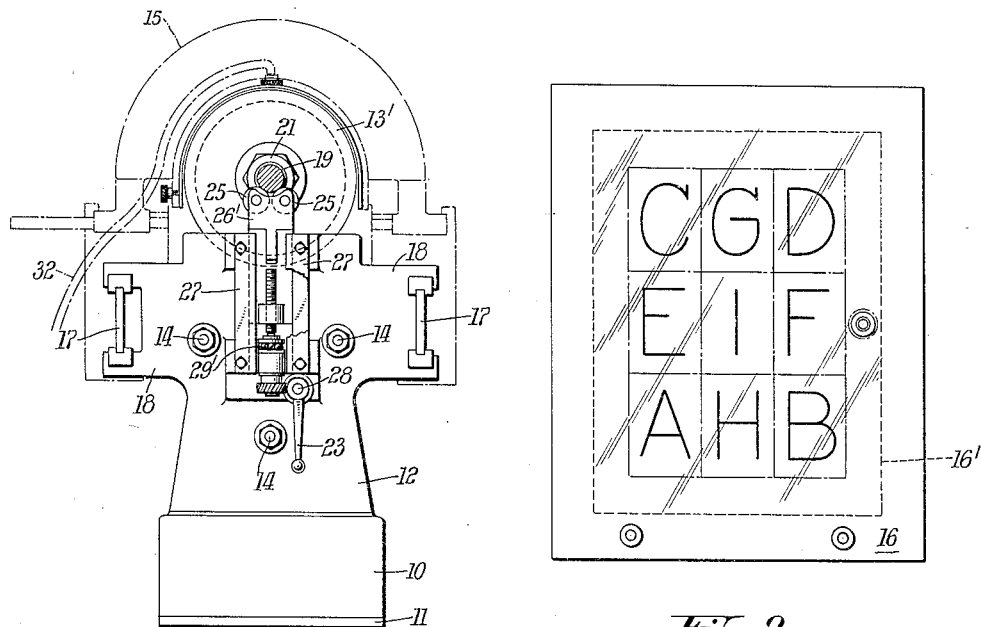
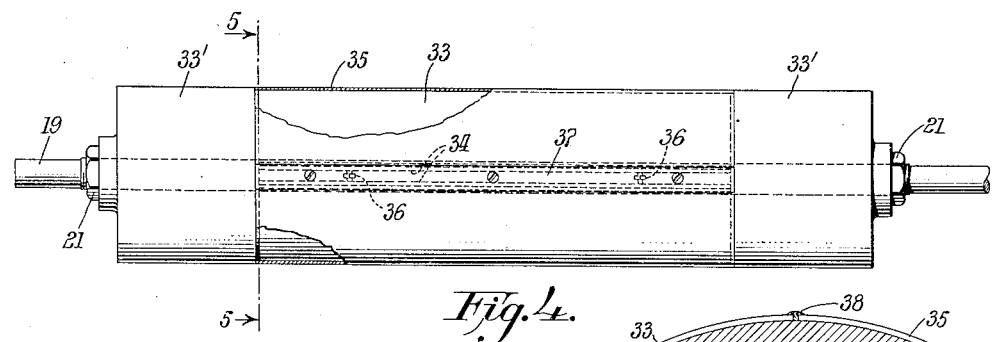
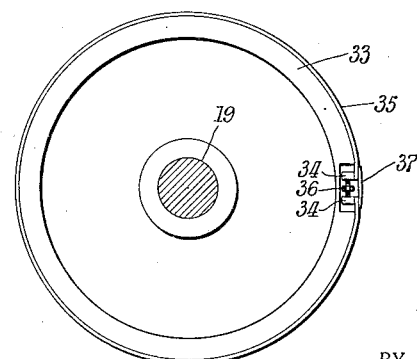
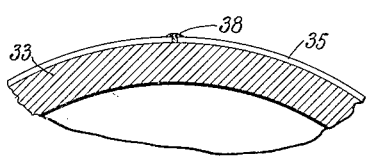
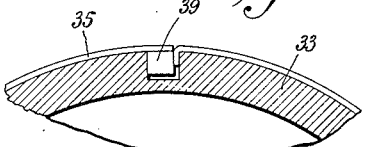

Patented Feb. 21, 1950

2,497,991

UNITED STATES PATENT OFFICE 2,497,991

PHOTOGRAPHIC CYLINDRICAL COMPOSING APPARATUS HAVING AUXILIARY SUPPORTS

William C. Huebner, New York, N. Y.

Application May 2, 1947, Serial No. 745,581

5 Claims. (Cl. 95—76)

This invention relates to improvements in photographic composing on cylindrical surfaces.

In U. S. Patent No. 2,091,280 granted to me on August 31, 1937, there is shown an improved photographic cylinder printing apparatus which is used for photographing images in pre-determined register on the surface of a printing cylinder such as is used with gravure presses and the like. With this prior art apparatus it is possible to register and print on a sensitized cylindrical surface using a transparency having an opaque image thereon.

It may be necessary, in photographic procedure of this description, to use a transparency, frequently referred to as a film negative, consisting of a multiplicity of separate subject images, only one of which is to be printed at a pre-determined location on the sensitized cylindrical surface. This one image may be located close to one side of the film negative and, in order to satisfy the conditions of layout, it may be required to print this image adjacent the opposite end of the sensitized cylinder. Such a situation results in the necessity for overlapping the film negative on the cylinder. Alternatively, to avoid overlapping, it would be necessary to resort to cutting and registering operations which involve considerable non-productive time.

Conditions such as the aforementioned are brought about by the mass production of pre-registered images on film produced on photo mechanical cameras, whereby multiple images of suitable sizes are placed on the film in order to reduce costs and accelerate production. Also, in color reproduction it is imperative that the separate colors comprising each subject be in exact register with each separate image as well as the overall area carrying a multiplicity of various images.

With the foregoing in mind it is the principal object of this invention to provide means whereby separate images on a film negative may be placed in contact with a sensitized printing cylinder wherever the lay-out of the form requires them to be placed. I accomplish this in part by providing a cylinder supporting mechanism adapted for use with film supporting and exposure devices, which will accommodate a standard length of printing cylinder and to which is added a pair of auxiliary cylinders adjacent the ends of the main cylinder, thereby providing a continuation of the cylindrical surface for film overlap. By a modification, which I describe in the following specification, it is also possible to employ similar auxiliary cylinders for use with a dummy cylinder accommodating flexible, sensitized printing plates, such as those used either for offset or for gravure printing. In the latter construction I provide for differing diameters of auxiliary cylinders and dummy cylinder so that a smooth continuous film supporting surface is presented which will not deleteriously affect the photographic negative in overlapping contact with the cylinder surface during photographic exposure.

Figure 2:
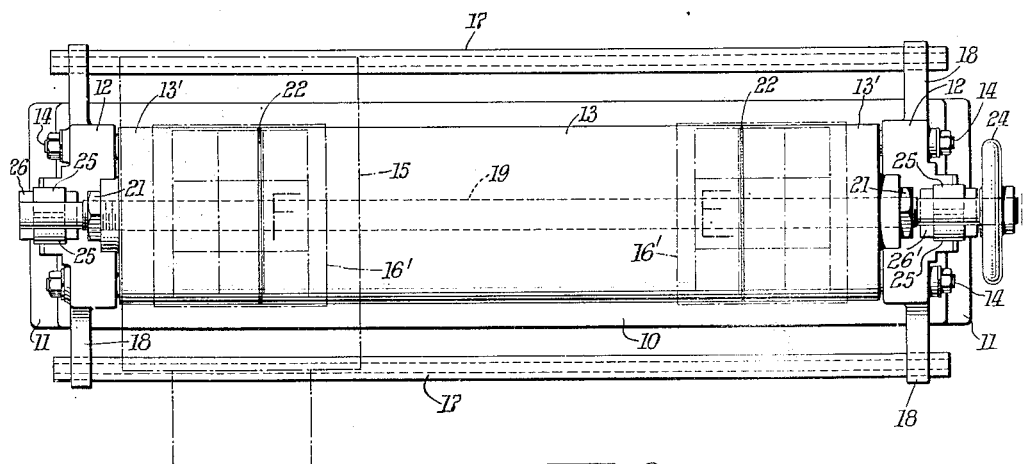

In the drawings, which show the preferred embodiment of my invention,

Figure 1 is a front elevation view, partly in cross section, showing the assembly of elements of the apparatus of my invention, Figure 2 is a top plan view of the apparatus of Figure 1, Figure 3 is a right hand end elevation view of the apparatus of my invention, Figure 4 is an elevation view showing details of my invention as modified for use with flexible plates, Figure 5 is a cross-section view taken through the cylinder on line 5—5 of Figure 4, and Figures 6 and 7 are fragmentary views of arrangements for fastening flexible plates to the cylinder similar to the showing in Figure 5.

Figure 8 is a plan view illustrating a photographic negative having various images thereon and registered therewith.

Referring to Figures 1 and 2, a rigid metal base 10 having floor pads 11 is provided as a supporting structure. A pair of vertical end frames 12 are integral with or may be removably secured to base 10 to give elevated support to cylinder 13, on the surface of which an image is to be photographed; and rigidity of the structure is enhanced by tie bars 14 extending therebetween. A vacuum printing frame 15, shown diagrammatically, may be adjustably arranged with respect to cylinder 13 and includes a photographic negative support 16, in which is carried a film negative 16'.

Details of construction of the vacuum printing frame, including the flexible negative support, exposure lamps, and the auxiliary equipment and controls to effect precise adjustments of the frame transversely and longitudinally with respect to the cylinder 13, are omitted here as they are of known construction, such as may be understood in a consideration of my prior art Patent No. 2,091,280. A slight difference between the diagrammatically illustrated frame 15 shown here and that of my aforementioned patent exists in that the present frame is shown extending entirely over the top half of the cylinder whereas in the patent the frame covers only one quarter of the cylindrical surface. The obvious advantage in the present construction is the accommodation of larger negatives and the possibility of printing a greater surface area. Support for the traverse of a vacuum frame 15 longitudinally of cylinder 13 is provided at the front and rear of the apparatus by the two longitudinally disposed vacuum frame support bars 17 suitably fixed in end frame side arms 18 and substantially coextensive with the length of the apparatus.

Cylinder 13 is a conventional style of printing cylinder, constructed for sensitizing in a known manner to accept the transfer of a photographic image, and cylinder support shaft 19 assembled therewith is machined for a sliding fit within cylinder hubs 20. Shaft 19 extends a sufficient distance beyond the ends of the main cylinder 13 to permit a pair of auxiliary cylinders 13', of the same diameter as main cylinder 13, to be slidably fitted thereover at each end thereof. Shaft 19, likewise, provides extending trunnions so that the entire assembly may be conveniently supported for indexing.

When main cylinder 13 and auxiliary cylinders 13' have been assembled on shaft 19 the parts are held securely in abutting relationship by means of a pair of lock-nuts 21 which engage screw threaded portions of the shaft. Gaskets 22 of rubber or other resilient material are included between the surfaces of abutment of main cylinder 13 and auxiliary cylinders 13' to give an hermetic seal at the juncture of these members.

Referring particularly to Figures 1 and 3, the trunnion ends of the cylinder supporting shaft are arranged to rest on hardened steel rollers 25 rotatably mounted in retainer members 26, 26' which, in turn, are guided for vertical adjustment against the outside surface of end frames 12 by the guide members 27 fixed to end frames 12. Hand crank 23 on shaft 28, trunnioned in end frames 12 and suitably interconnected with the screw thread elevating devices 29, 29' on the left and right ends of the apparatus, permits raising and lowering of cylinder shaft 19 for vertical alignment with frame 15, thereby adapting the equipment for use with cylinders of different diameters. Detachable handwheel 24 is provided on the right hand end of shaft 19 along with suitable indexing apparatus, not shown, so that precise angular adjustment of the cylinder may be made.

In operation, the necessary adjustments are first effected by crank 23 and handwheel 24 for vertical and angular alignment of the composite cylinder. Transverse alignment of vacuum frame 15 may then be made employing apparatus of my aforementioned patent and, likewise, the frame 15 may be adjusted longitudinally of the cylinder 13 so that, during exposure, the portion of the negative 16' in frame 15 which is intended for a particular position on the cylinder 13 may be properly positioned. For example, it may be required that the image F of the multiple image negative 16' of Figure 8 be placed close to the left hand end of cylinder 13, as is diagrammatically illustrated in Figure 2. This being the case the vacuum frame 15 is moved to the extreme left to an adjusted location which will bring the negative 16' in precise position longitudinally of the composite cylinder. If it is necessary to mask the negative, those who are skilled in the art will understand the technique of applying such opaquing devices to permit the passage of light only through specified areas of the negative.

When the foregoing adjustments and settings are completed, motor 30 is started to drive vacuum pump 31 interconnected by flexible supply line 32 with the flexible film holder 16 of vacuum frame 15 which draws the negative 16' in firm contact with the sensitized surface of cylinder 13 overlapping on the left hand auxiliary cylinder 13'. By reason of the fact that the composite cylinder formed by main cylinder 13 and auxiliary cylinders 13' presents the equivalent of a continuous imperforate cylindrical surface, vacuum frame equipment used and the procedure for operation may be substantially identical with that of my prior art patent aforementioned, the auxiliary cylinder forming an extension surface against which a flexible vacuum negative holder may rest. Gasketing the abutment of the ends of cylinder 13 and auxiliary cylinder 13' provides that there will be no loss of vacuum between the mating parts.

When vacuum has been applied and the film drawn in contact with the combined cylindrical surfaces of the main sensitized cylinder and an auxiliary cylinder, the usual exposure operations may be made, followed by exposure repetition when this is necessary, and by other printing preparation according to the printing techniques to be used. It will be understood at this point that overlapping may be effected on either end of the main cylinder as by placing the letter E located on the left side of film 16' in a position on the right end of cylinder 13, as shown in Figure 2. Moreover, if overlapping is never required on other than one end of cylinder 13, then only one auxiliary cylinder may be used and the balance of the photocomposing equipment modified for the foreshortened requirements, with one lock-nut 21 bearing directly against a cylinder hub 19.

As shown in the modification of Figures 4 and 5, my apparatus may also be used with thin flexible plates for offset, rotogravure or the like. In this instance a dummy plate receiving cylinder 33 is provided, around which the flexible plate 35 is wrapped. A suitable longitudinal cut-out is provided in cylinder 35 to accommodate the plate clamping bars 34 which are suitably fastened to the plate along the clamping edges. For fastening bars 34 to plate 35 small projecting pins may be set in the bars to engage correspondingly spaced holes at the plate edges or, a semi-permanent fastening may be used such as a spot weld or solder joint, which may be broken in order that the plate may be later applied to a printing press plate cylinder. The left and right hand threaded fastening studs 36, spaced along and engaging suitable tapped holes in bars 34, permit drawing the plate 35 taut on cylinder 33 and protecting cover plate 37 is fastened over the cut-out portion. The auxiliary cylinders 33' which are used to abut dummy cylinder 33 have an outside diameter equal to that of cylinder 33 plus twice plate thickness, presenting conditions which are equivalent with those described above for the plateless cylinder.

As alternative plate clamping facility, the modifications of the fragmentary views of Figures 6 and 7 may be substituted for that of Figure 5. In Figure 6 the cylinder cut-out is avoided entirely and the tightly drawn butt ends of plate 35 are spotted with solder 38 along the cylinder 33. In Figure 7 a single clamping bar 39 attached to plate 35 is disposed in a narrow slot in cylinder 33 and the free end of the plate is drawn taut and wedged between bar 39 and the slot edge. Using the arrangement of Figure 5, or the alternative of Figure 6 or of Figure 7, the cylinder 33 with plate 35 may be coated with sensitizing material in a cylinder coating machine using identical equipment to that for plateless cylinders.

It will be understood that the foregoing is illustrative of my invention and that various changes in size, shape and arrangement of component parts may be made within the scope of the claims. Standard sizes of auxiliary cylinders may be used in production composing and these may be quickly and easily removed from the main shaft in order that a work cylinder can be finished in the usual manner and the auxiliary extension cylinders applied to another shaft to carry on the work on other cylinders in the composing machine.

I claim:

1. A composite cylinder for printing preparation in cylindrical surface composing machines comprising, in combination, a main cylindrical section of printing cylinder length, a photosensitive layer over the cylindrical section, whereby photographic negatives being printed thereon in marginal areas thereof overlap the ends of the cylinder, an auxiliary cylindrical section shorter than but of equal diameter with the main cylindrical section concentrically abutting an end of the main cylindrical section and of sufficient length to accommodate the overlap of printing negatives resting on the main cylindrical section, a supporting trunnion carrying the main cylindrical section and the auxiliary cylindrical section, and clamping means rotatable with said supporting trunnion to maintain the abutting relationship between the main cylindrical section and the auxiliary section.

2. In apparatus for photo composing, in combination, a main cylinder of printing cylinder length having a sensitized layer upon which a photographic image is adapted to be produced substantially to the extremities of its peripheral area, auxiliary cylinders abutting the ends of the main cylinder of identical diameter with the main cylinder, supporting shaft means to maintain a concentric relationship between the main cylinder and the auxiliary cylinders, and a printing frame carrier having a fixed relationship with said supporting shaft means to permit the traverse of a printing frame longitudinally with respect to the main cylinder and beyond its extremities whereby images may be photo-composed on the main cylinder to its marginal extremities by the use of a negative in overlapping relationship therewith resting partly on an auxiliary cylinder.

3. In apparatus for photo composing, in combination, a main cylinder of printing cylinder length having a sensitized layer upon which the photographic image is adapted to be impressed, shorter auxiliary cylinders of main cylinder diameter abutting the ends of the main cylinder, a supporting shaft to maintain a concentric relationship between the main cylinders and the auxiliary cylinders, gaskets between the auxiliary cylinders and the main cylinder, means to clamp the auxiliary cylinders against the main cylinder in hermetic sealing relationship therewith, and a printing frame carrier having a fixed relationship with said supporting shaft means to permit the traverse of a printing frame longitudinally with respect to the main cylinder whereby photographic images may be composed to the marginal extremities of the main cylinder by the use of a negative resting on an auxiliary cylinder in overlapping relationship with the main cylinder.

4. In a cylindrical surface photocomposing machine, in combination, a sensitized cylindrical surface, a rotatable support for said surface, auxiliary cylindrical members of the diameter of the cylindrical surface removably abutting the ends of the sensitized cylindrical surface and hermetically sealed therewith, a carriage adjustable lengthwise of the cylindrical surface including a support for a curved image carrier, whereby a carrier will clear the sensitized surface during movement of the carriage with respect to the surface, an image carrier on said carriage, means for contacting the surface of the image carrier with the sensitized cylindrical surface in overlapping relationship with the sealed auxiliary cylinders, and vacuum means for exhausting air from the contacting area whereby images may be exposed on the sensitized surface.

5. A composite cylinder for printing preparation in cylindrical surface composing machines comprising, in combination, a main cylindrical section of printing cylinder length, a photo-sensitized flexible plate covering the cylindrical section whereby photographic negatives being printed thereon in marginal areas thereof overlap the ends of the cylinder and plate, an auxiliary cylindrical section shorter than the main cylindrical section having a diameter equal to that of the main cylindrical section increased by the dimension of a flexible plate mounted thereon and concentrically abutting an end of the main cylindrical section, said auxiliary cylindrical section being of sufficient length to accommodate the overlap of printing negatives resting on the mounted sensitized plate, a supporting trunnion carrying the main cylindrical section and the auxiliary cylindrical section, and clamping means rotatable with said supporting trunnion to maintain the abutting hermetically sealed relationship between the main cylindrical section and the auxiliary section.

WILLIAM C. HUEBNER.

REFERENCES CITED

The following references are of record in the file of this patent:

UNITED STATES PATENTS

| Number | Name | Date |
|---|---|---|
| 1,587,001 | Jones | June 1, 1926 |
| 2,091,280 | Huebner | Aug. 31, 1937 |
| 2,267,646 | Gorig | Dec. 23, 1941 |
| 2,374,194 | Grupe | Apr. 24, 1945 |